(12) United States Patent  (10) Patent No.: US 8,873,850 B2
Krishnaswamy  (45) Date of Patent: Oct. 28, 2014

(54) DETECTING EXPOSURE QUALITY IN IMAGES

(71) Applicant: Aravind Krishnaswamy, San Jose, CA (US)

(72) Inventor: Aravind Krishnaswamy, San Jose, CA (US)

(73) Assignee: Google Inc., Mountain View, CA (US)

( * ) Notice: Subject to any disclaimer, the term of this patent is extended or adjusted under 35 U.S.C. 154(b) by 28 days.

(21) Appl. No.: 13/691,718

(22) Filed: Nov. 30, 2012

(65) Prior Publication Data

US 2014/0153827 A1  Jun. 5, 2014

(51) Int. Cl.
G06K 9/00 (2006.01)
G06K 9/40 (2006.01)
G06K 9/46 (2006.01)
G06T 7/00 (2006.01)

(52) U.S. Cl.
CPC ......... G06K 9/40 (2013.01); G06T 2207/30168 (2013.01); G06K 9/46 (2013.01); G06T 7/0002 (2013.01)
USPC ............................. 382/168; 382/118; 382/154

(58) Field of Classification Search
None
See application file for complete search history.

(56) References Cited

U.S. PATENT DOCUMENTS

| 2004/0109072 | A1* | 6/2004 | Gallagher | 348/246 |
| 2006/0257050 | A1* | 11/2006 | Obrador | 382/286 |
| 2007/0110305 | A1 | 5/2007 | Corcoran et al. | |
| 2007/0177050 | A1 | 8/2007 | Xiao et al. | |
| 2010/0020194 | A1* | 1/2010 | Hirooka | 348/229.1 |
| 2012/0307107 | A1 | 12/2012 | Brunner | |

OTHER PUBLICATIONS

International Search Report cited in corresponding PCT Application No. PCT/US2013/071760, mailed Jun. 2, 2014.
Written Opinion and International Search Report cited in corresponding PCT Application No. PCT/US2013/071760, mailed Feb. 6, 2014.

* cited by examiner

*Primary Examiner* — Andrae S Allison

(57) ABSTRACT

Systems, methods and computer readable media for exposure quality detection are described. In some implementations, a method can include computing an overall image exposure score for an image. The method can also include determining one or more face regions in the image. The method can further include computing a face region exposure score for each face region. The method can also include combining the overall image exposure score and each face region exposure score to generate an exposure quality score for the image.

17 Claims, 4 Drawing Sheets

DETECTING EXPOSURE QUALITY IN IMAGES

BACKGROUND

Computers and mobile devices are often equipped with cameras that permit users to acquire digital images. The digital images can be acquired in various settings including ambient light of varying levels and therefore may be underexposed or overexposed. When attempting to automatically curate and/or correct images, it may be helpful to use exposure quality as a signal of overall image quality.

SUMMARY

Some implementations relate generally to image processing, and, more particularly, to detecting exposure quality in images.

Some implementations can include a method comprising computing an overall image exposure score for an image, where the overall exposure score is based on a clipped pixel score and a tonal distribution score. The method can also include determining one or more face regions in the image. The method can further include computing a face region exposure score for each face region, where the face region exposure score includes a clipped pixel score and a face region tonal distribution score. The method can also include adjusting the overall image exposure score and each face region exposure score according to a penalty value.

The method can further include combining the overall image exposure score and each face region exposure score to generate an exposure quality score for the image and applying one or more of an overall exposure correction and an independent correction for each face region.

Some implementations can include a method comprising computing an overall image exposure score for an image and determining one or more face regions in the image. The method can also include computing a face region exposure score for each face region and combining the overall image exposure score and each face region exposure score to generate an exposure quality score for the image.

The overall image exposure score can include a clipped pixel score and a tonal distribution score based on a histogram of the image. Each face region exposure score can include a clipped pixel score and a face region tonal distribution score based on a histogram of the image. The face region tonal distribution score can include a determination of a distance of each of a median histogram value and a mean histogram value from a predetermined histogram section. The clipped pixel score can be computed for each color channel of a plurality of color channels.

The method can also include adjusting the overall image exposure score according to a penalty value when a zone value for each color channel exceeds a predetermined threshold and adjusting each face region exposure score according to the penalty value when a zone value for each color channel exceeds a predetermined threshold. The method can further include applying one or more of an overall exposure correction and an independent correction for each face region. The method can also include automatically curating the image based on the exposure quality score for the image.

Some implementations can include a system having one or more computers configured to perform operations. The operations can include computing an overall image exposure score for an image. The operations can also include determining one or more face regions in the image. The operations can further include computing a face region exposure score for each face region and combining the overall image exposure score and each face region exposure score to generate an exposure quality score for the image.

The overall image exposure score can include a clipped pixel score and a tonal distribution score based on a histogram of the image. Each face region exposure score can include a clipped pixel score and a face region tonal distribution score based on a histogram of the image. The face region tonal distribution score can include a determination of a distance of each of a median histogram value and a mean histogram value from a predetermined histogram section. The clipped pixel score is computed for each color channel of a plurality of color channels.

The operations can also include adjusting the overall image exposure score according to a penalty value when a zone value for each color channel exceeds a predetermined threshold and adjusting each face region exposure score according to the penalty value when a zone value for each color channel exceeds a predetermined threshold. The operations can further include applying one or more of an overall exposure correction and an independent correction for each face region. The operations can also include automatically curating the image based on the exposure quality score for the image.

DETAILED DESCRIPTION

Figure 1:
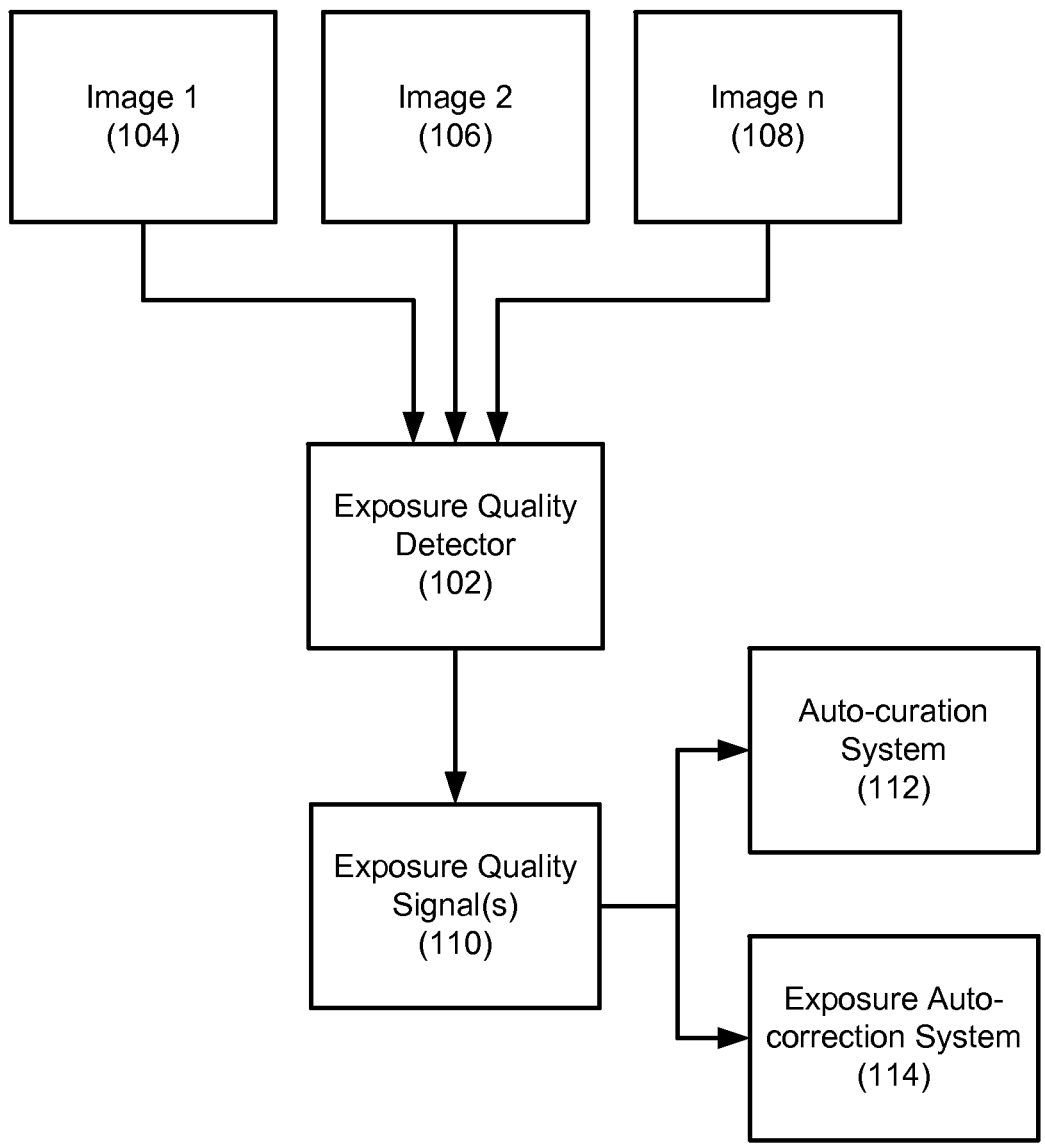
FIG. 1 is a diagram of an example exposure quality detection system in accordance with some implementations.

As shown in FIG. 1, an exposure quality detection system environment can include an exposure quality detector 102 adapted to receive and process one or more images (104-108).

In operation, the exposure quality detector 102 receives one or more images (104-108) and automatically determines an exposure quality associated with each image. The exposure quality information can be provided as an output signal 110 and/or stored in a data storage system along with or associated with a corresponding image. The exposure quality signal(s) 110 can be provided to an automatic curation system 112 and/or an exposure auto-correction system 114. The automatic curation system 112 can help a user curate (or select) photos.

The exposure quality detector 102 can be part of an image processing system (e.g., photo management software). The detector 102 can be adapted to operate on a desktop computer, a laptop computer or a mobile device (e.g., smartphone, tablet or the like).

Figure 2:
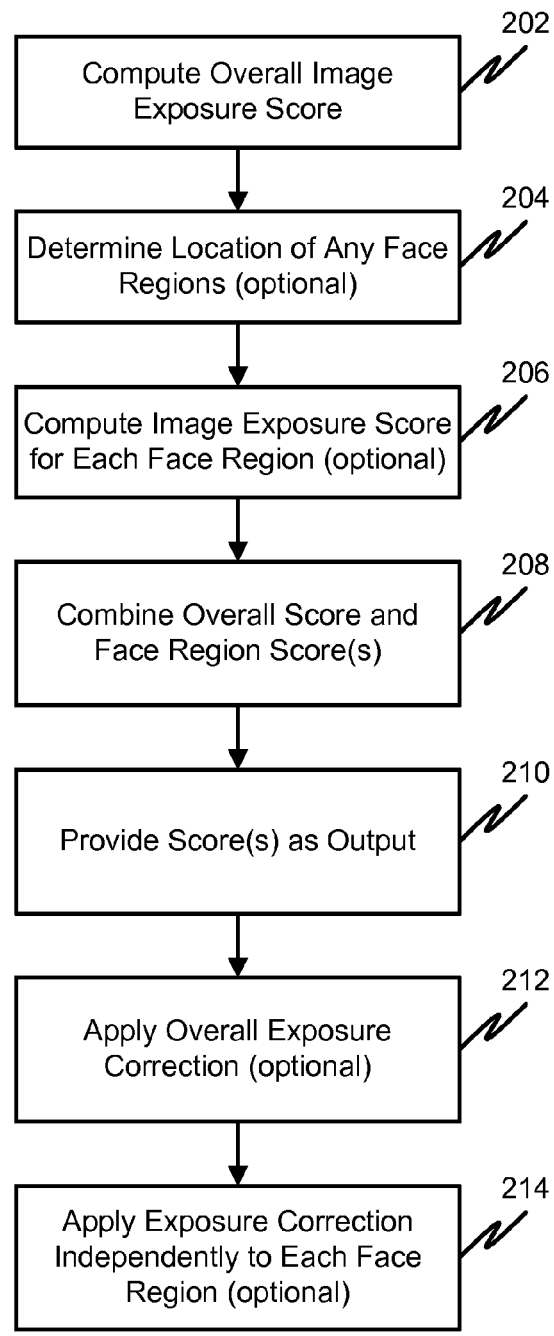
FIG. 2 is a flow chart of an example method for detecting exposure quality in images in accordance with some implementations.

FIG. 2 is a flow chart of an example method 200 for detecting exposure quality in accordance with some implementations. Processing begins at 202, where an overall image exposure score is computed. For example, the exposure quality detector 102 can compute an overall exposure quality score. Details of computing an exposure quality score as discussed below in connection with FIG. 3. Processing continues to 204.

At 204, regions of the image containing human faces are determined. Determining regions containing (or possibly containing) faces can be accomplished using one or more facial detection systems. Processing continues to 206.

At 206, an image exposure score is computed for each face region in the image. The image exposure score for a face region can be determined using a different technique than that used for an overall image exposure score, as discussed below in connection with FIG. 3. Processing continues to 208.

At 208, the overall image exposure score and the face regions image exposure score(s) are combined. The combining of the scores can vary depending on the purpose of the exposure quality detection. For example, for auto-curation purposes, a system may emphasize (or use) the lowest score as an indicator, which could mean for instance that an image with a very dark background and well exposed faces would not be reported as being under exposed. For auto-correction tasks, the individual exposure scores could be used independently correct local regions containing faces based on the corresponding exposure quality score. The system can select the overall image exposure score, one or more face regions scores, or a combination of the above as an indicator. Processing continues to 210.

At 210 the overall image exposure score, one or more face region scores and/or a combined score can be provided as output for downstream processing or as input to another system. Processing continues to 212.

At 212, an overall exposure correction is optionally performed. The overall correction can be based on the overall image exposure score. For example, a curve could be applied to the histogram of the image in order to correct an exposure problem determined by the system. Processing continues to 214.

At 214, an exposure correction is optionally applied independently to each face region. The overall correction can be based on the overall image exposure score. For example, a curve could be applied to the histogram of the face region of the image in order to correct an exposure problem determined by the system at that region. It will be appreciated that 202-214 can be repeated in whole or in part in order to accomplish a contemplated image exposure quality detection task.

Figure 3:
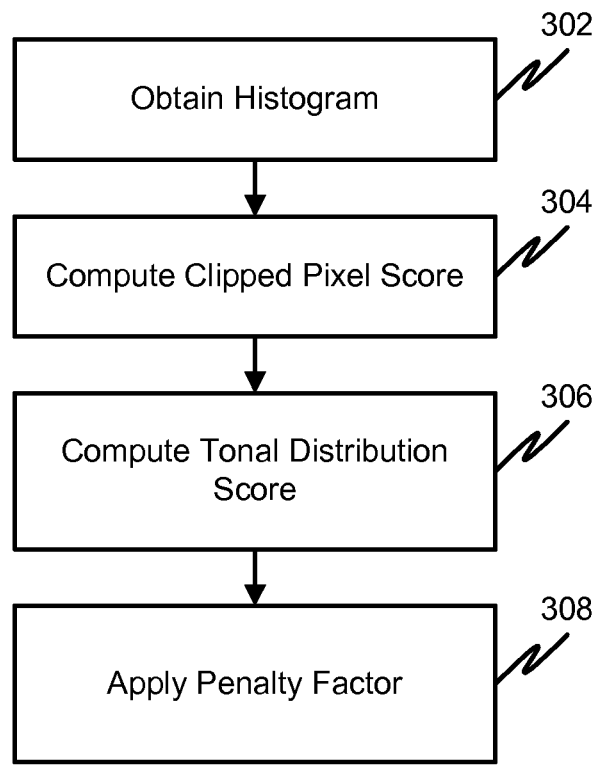
FIG. 3 is a flow chart of an example method for detecting exposure quality in images in accordance with some implementations.

FIG. 3 is a flow chart of an example image exposure quality detection method in accordance with some implementations. Processing begins at 302, where a histogram of an image is obtained. The histogram can be obtained from another system or module, or can be calculated directly from the image. Processing continues to 304.

At 304, a clipped pixel score is computed. Clipped pixels are those pixels that have a value of 0 or 255 (or which otherwise represent the lowest and the highest values). The clipped pixel score is determined for each color channel as follows: $(1+c)^2$ (for the highlight pixels, e.g. 255) and $-(1+c)^2$ (for shadow pixels, or those with a 0 value). Processing continues to 306.

At 306, a tonal distribution score is computed. The histogram obtained at 302 can be used. The histogram is compacted (or reduced) to 11 zones (e.g., Zones 0 to 10). Then, the median and mean of the histogram are determined. The tonal distribution score is computed by determining a distance ($d_1$) of Zone 0 to the median/max zone and a distance ($d_2$) from Zone 10 to the median/max zone and summing squares of the two scores.

When computing the tonal distribution score on a face region, median and mean values too far away from Zone 6 (e.g., a zone associated with human skin) are punished (or deemphasized). Also, when computing the tonal distribution score for a face region, the color channels can be weighted unevenly to emphasize the red channel, which is associated with human skin.

In an image having one or more face regions, the face exposure quality score can be weighted based on the area of the face region(s). For example, in an image in which 3 faces are detected (e.g., f1, f2 and f3), the system computes the area of each face region (e.g., a1, a2 and a3, respectively). The area of each face can be clamped to a maximum area (e.g., 25% of total area) in order to help make the exposure scoring more reliable in images having small faces in the background. The face score can then be weighted according to the area, for example face_score=(f1*a1+f2*a2+f3*a3)/(a1+a2+a3). Processing continues to 308.

At 308, a penalty is applied when all three color channels have maximum zone values that are either 9 or 1. The penalty is applied by $t=t^2$ where t is the current tonal distribution score.

Figure 4:
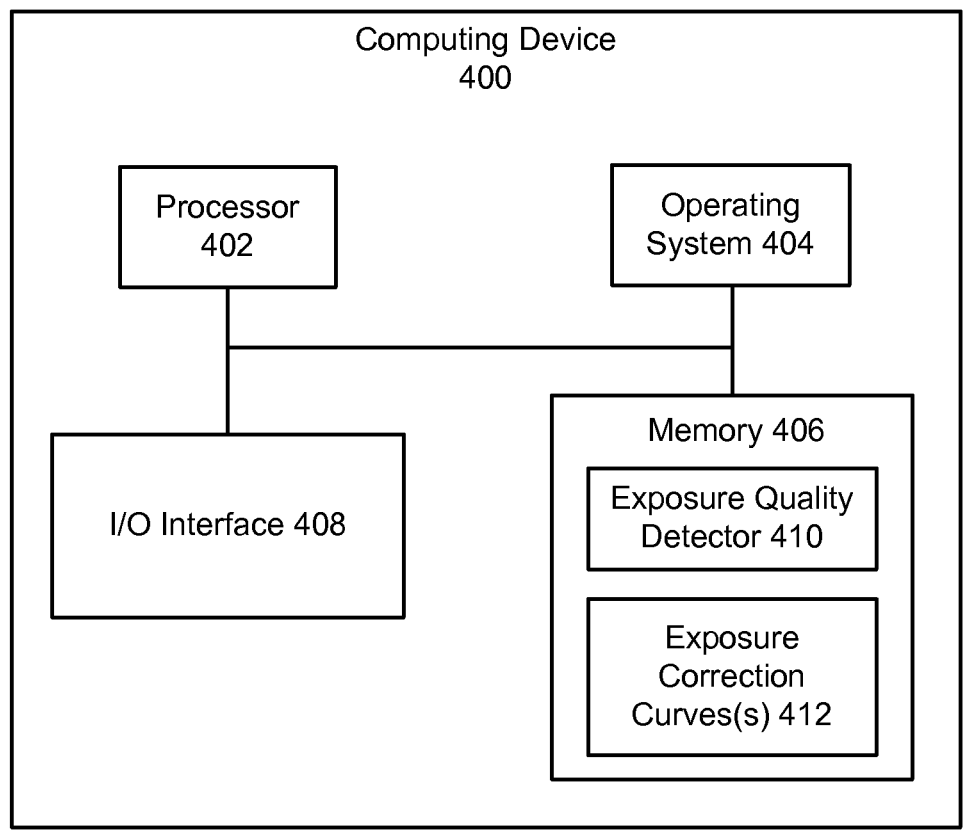
FIG. 4 is a diagram of an example exposure quality detection computing device in accordance with some implementations.

FIG. 4 is a diagram of an example computing device 400 that can be used to detect exposure quality in images in accordance with some implementations. The computing device 400 includes a processor 402, operating system 404, memory 406 and I/O interface 408. The memory 406 can include an exposure quality detector 410 and one or more exposure correction curves 412.

In operation, the processor 402 may execute the exposure quality detector application 410 stored in the memory 406. The exposure quality detector 410 can include software instructions that, when executed by the processor, cause the processor to perform operations for exposure quality detection in accordance with the present disclosure (e.g., the exposure quality detector 410 can perform one or more of steps 202-214 and/or 302-308 described above and, in conjunction, can access the correction curves 412). The exposure quality detector 410 can also operate in conjunction with the operating system 404.

The exposure quality detector computing device (e.g., 102 and/or 400) can include, but is not limited to, a single processor system, a multi-processor system (co-located or distributed), a cloud computing system, or a combination of the above.

The client (or user) device can include, but is not limited to, a desktop computer, a laptop computer, a portable computer, a tablet computing device, a smartphone, a feature phone, a personal digital assistant, a media player, an electronic book reader, an entertainment system of a vehicle or the like.

The user devices can be connected to an exposure quality detection system via a network. The network connecting user devices to an exposure quality detection system can be a wired or wireless network, and can include, but is not limited to, a WiFi network, a local area network, a wide area network, the Internet, or a combination of the above.

The data storage, memory and/or computer readable medium can be a magnetic storage device (hard disk drive or the like), optical storage device (CD, DVD or the like), electronic storage device (RAM, ROM, flash, or the like). The software instructions can also be contained in, and provided as, an electronic signal, for example in the form of software as a service (SaaS) delivered from a server (e.g., a distributed system and/or a cloud computing system).

Moreover, some implementations of the disclosed method, system, and computer readable media can be implemented in software (e.g., as a computer program product and/or computer readable media having stored instructions for detecting exposure quality in images as described herein). The stored software instructions can be executed on a programmed general purpose computer, a special purpose computer, a microprocessor, or the like.

It is, therefore, apparent that there is provided, in accordance with the various example implementations disclosed herein, systems, methods and computer readable media for detecting exposure quality in images.

While the disclosed subject matter has been described in conjunction with a number of implementations, it is evident that many alternatives, modifications and variations would be or are apparent to those of ordinary skill in the applicable arts. Accordingly, Applicant intends to embrace all such alternatives, modifications, equivalents and variations that are within the spirit and scope of the disclosed subject matter.

What is claimed is:

1. A method comprising:
computing an overall image exposure score for an image, the overall exposure score being based on a clipped pixel score and a tonal distribution score;
determining one or more face regions in the image;
computing a face region exposure score for each face region, the face region exposure score including a clipped pixel score and a face region tonal distribution score;
adjusting the overall image exposure score and each face region exposure score according to a penalty value;
combining the overall image exposure score and each face region exposure score to generate an exposure quality score for the image; and
applying one or more of an overall exposure correction and an independent correction for each face region.

2. A method comprising:
computing an overall image exposure score for an image;
determining one or more face regions in the image;
computing a face region exposure score for each face region
adjusting the overall image exposure score and each face region
exposure score according to a penalty value; and
combining the overall image exposure score and each face region
exposure score to generate an exposure quality score for the image.

3. The method of claim 2, wherein the overall image exposure score includes a clipped pixel score and a tonal distribution score based on a histogram of the image.

4. The method of claim 2, wherein each face region exposure score includes a clipped pixel score and a face region tonal distribution score based on a histogram of the image.

5. The method of claim 4, wherein the face region tonal distribution score includes a determination of a distance of each of a median histogram value and a mean histogram value from a predetermined histogram section.

6. The method of claim 2, wherein the clipped pixel score is computed for each color channel of a plurality of color channels.

7. The method of claim 6, further comprising adjusting the overall image exposure score according to a penalty value when a zone value for each color channel exceeds a predetermined threshold and adjusting each face region exposure score according to the penalty value when a zone value for each color channel exceeds a predetermined threshold.

8. The method of claim 2, further comprising applying one or more of an overall exposure correction and an independent correction for each face region.

9. The method of claim 2, further comprising automatically curating the image based on the exposure quality score for the image.

10. A system comprising one or more computers configured to perform operations including:
computing an overall image exposure score for an image;
determining one or more face regions in the image;
computing a face region exposure score for each face region;
adjusting the overall image exposure score and each face region
exposure score according to a penalty value; and
combining the overall image exposure score and each face region
exposure score to generate an exposure quality score for the image.

11. The system of claim 10, wherein the overall image exposure score includes a clipped pixel score and a tonal distribution score based on a histogram of the image.

12. The system of claim 10, wherein each face region exposure score includes a clipped pixel score and a face region tonal distribution score based on a histogram of the image.

13. The system of claim 12, wherein the face region tonal distribution score includes a determination of a distance of each of a median histogram value and a mean histogram value from a predetermined histogram section.

14. The system of claim 10, wherein the clipped pixel score is computed for each color channel of a plurality of color channels.

15. The system of claim 14, further comprising adjusting the overall image exposure score according to a penalty value when a zone value for each color channel exceeds a predetermined threshold and adjusting each face region exposure score according to the penalty value when a zone value for each color channel exceeds a predetermined threshold.

16. The system of claim 10, further comprising applying one or more of an overall exposure correction and an independent correction for each face region.

17. The system of claim 10, further comprising automatically curating the image based on the exposure quality score for the image.

* * * * *